(12) United States Patent
Szilagyi et al.

(10) Patent No.: US 12,041,486 B2
(45) Date of Patent: Jul. 16, 2024

(54) ACTIVE MODE TRAFFIC STEERING AND SWITCHING BETWEEN CELLULAR AND NON-CELLULAR SYSTEMS

(71) Applicant: Nokia Technologies Oy, Espoo (FI)

(72) Inventors: Peter Szilagyi, Budapest (HU); Csaba Vulkan, Budapest (HU)

(73) Assignee: NOKIA TECHNOLOGIES OY, Espoo (FI)

(*) Notice: Subject to any disclaimer, the term of this patent is extended or adjusted under 35 U.S.C. 154(b) by 307 days.

(21) Appl. No.: 17/283,507

(22) PCT Filed: Oct. 11, 2018

(86) PCT No.: PCT/US2018/055488
§ 371 (c)(1),
(2) Date: Apr. 7, 2021

(87) PCT Pub. No.: WO2020/076331
PCT Pub. Date: Apr. 16, 2020

(65) Prior Publication Data
US 2023/0144074 A1 May 11, 2023

(51) Int. Cl.
*H04W 28/086* (2023.01)
*H04L 45/24* (2022.01)
*H04L 47/24* (2022.01)
*H04L 69/14* (2022.01)

(52) U.S. Cl.
CPC ......... *H04W 28/0861* (2023.05); *H04L 45/24* (2013.01); *H04L 47/24* (2013.01); *H04L 69/14* (2013.01)

(58) Field of Classification Search
CPC .......... H04L 45/24; H04L 47/24; H04L 69/14
See application file for complete search history.

(56) References Cited

U.S. PATENT DOCUMENTS

2014/0362765 A1* 12/2014 Biswas ................ H04L 67/141
370/328
2015/0237525 A1* 8/2015 Mildh ..................... H04L 47/15
370/230.1

(Continued)

FOREIGN PATENT DOCUMENTS

WO    WO-2017212025 A1    12/2017

OTHER PUBLICATIONS

Munir, Ali et al., "Multipath TCP Traffic Diversion Attacks and Countermeasures," 2017 IEEE 25th International Conference on Network Protocols (ICNP), IEEE, Oct. 10, 2017, pp. 1-10.

(Continued)

*Primary Examiner* — Mandish K Randhawa
(74) *Attorney, Agent, or Firm* — Lippes Mathias LLP

(57) ABSTRACT

In some example embodiments, there may be provided a method. The method may include receiving, by a network node, at least one packet of a sub-flow of a multipath transport control protocol connection associated with user plane traffic, the at least one packet including a header, the header further including a multipath transport control protocol option; and switching, by the network node, the sub-flow by at least changing the multipath transport control protocol option. Related systems, methods, and articles of manufacture are also described.

18 Claims, 14 Drawing Sheets

(56) References Cited

U.S. PATENT DOCUMENTS

2017/0078206 A1    3/2017  Huang et al.
2017/0134971 A1*   5/2017  Huang ................. H04W 24/02

OTHER PUBLICATIONS

"3rd Generation Partnership Project; Technical Specification Group Radio Access Network; Study on separation of NR Control Plane (CP) and User Plane (UP) for split option 2; (Release 15)", 3GPP TR 38.806, V15.0.0, Dec. 2017, pp. 1-22.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 13)", 3GPP TS 36.300, V13.12.0, Jun. 2018, pp. 1-313.
"3rd Generation Partnership Project; Technical Specification Group Radio Access Network; Evolved Universal Terrestrial Radio Access (E-UTRA) and NR; Multi-connectivity; Stage 2; (Release 15)", 3GPP TS 37.340, V15.3.0, Sep. 2018, pp. 1-59.
Ford, A. et al., "Architectural Guidelines for Multipath TCP Development," Internet Engineering Task Force (IETF), Request for Comments: 6182, Mar. 2011, pp. 1-28.
Ford, A. et al., "TCP Extensions for Multipath Operation with Multiple Addesses," Internet Engineering Task Force (IETF), Request for Comments: 8684, Mar. 2020, pp. 1-68.

* cited by examiner

1200

Receiving, by a network node, at least one packet of a sub-flow of a multipath transport control protocol connection associated with user plane traffic, the at least one packet including a header, the header further including a multipath transport control protocol option 1250

Switching, by the network node, the sub-flow by at least changing the multipath transport control protocol option, 1252

FIG. 12B

ACTIVE MODE TRAFFIC STEERING AND SWITCHING BETWEEN CELLULAR AND NON-CELLULAR SYSTEMS

FIELD

The subject matter described herein relates to cellular systems.

BACKGROUND

As the use of cellular systems including 5G increases, the demands on the cellular system will increase. In some instances, the cellular system may offload traffic offloading to non-cellular systems, such as wireless access networks including WiFi and other types of wireless and/or wired technologies. Likewise, traffic may be returned to the cellular system after an offload to the non-cellular system. The switching of traffic between cellular systems and non-cellular systems may cause issues including for example connectivity issues.

SUMMARY

Methods and apparatus, including computer program products, are provided for traffic switching.

In some example embodiments, there may be provided a method. The method may include receiving, by a network node, at least one packet of a sub-flow of a multipath transport control protocol connection associated with user plane traffic, the at least one packet including a header, the header further including a multipath transport control protocol option; and switching, by the network node, the sub-flow by at least changing the multipath transport control protocol option.

In some variations, one or more of the features disclosed herein including the following features can optionally be included in any feasible combination. The switching may switch the sub-flow on to allow the user plane traffic to flow through the sub-flow. The switching may switch the sub-flow off to prevent the user plane traffic from passing through the sub-flow such that the switched user plane traffic is carried by at least another sub-flow. The switching may include changing the multipath transport control protocol option by removing the MP_CAPABLE option from the header. The removing the MP_CAPABLE option may trigger a fallback from the multipath transport control protocol connection to a transport control protocol connection. The switching may include changing a sub-flow state by an indication in the multipath transport control protocol option in the sub-flow, wherein the sub-flow state comprises a backup state or an active state, wherein the changing of the sub-flow state enables the user plane traffic to be carried by the sub-flow in the active state or prevents the user plane traffic to be carried by the sub-flow in the backup state. The switching may include changing a sub-flow state by an indication of the multipath transport control protocol option of another sub-flow, wherein the sub-flow state comprises a backup state or an active state, wherein the changing of the sub-flow state enables the user plane traffic to be carried by the sub-flow in the active state. The multipath transport control protocol option may include an MP_Prio, an MP_Join, and/or MP_Prio including an address of the sub-flow or the other sub-flow. The method may include detecting, based on a data sequence number and a sub-flow sequence number obtained from the header, a presence of an invisible sub-flow not passing through the network node and/or switching, by the network node, the invisible sub-flow on or off by at least changing the multipath transport control protocol option in the header of the packet of the sub-flow received by the network node. The switching the invisible sub-flow on may allow the user plane traffic to pass through the invisible sub-flow, and wherein switching the invisible sub-flow off prevents the user plane traffic from passing through the invisible sub-flow and allows the user plane traffic to be carried by at least one other sub-flow. The switching of the user plane traffic may be between a cellular radio access network and a non-cellular network. The user plane traffic may represent traffic being offloaded from the cellular radio access network to the non-cellular network comprising a WiFi network. The network node may be a cellular base station.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

DESCRIPTION OF DRAWINGS

In the drawings,

FIG. 12B depicts an example process, in accordance with some example embodiments.

Figure 1:
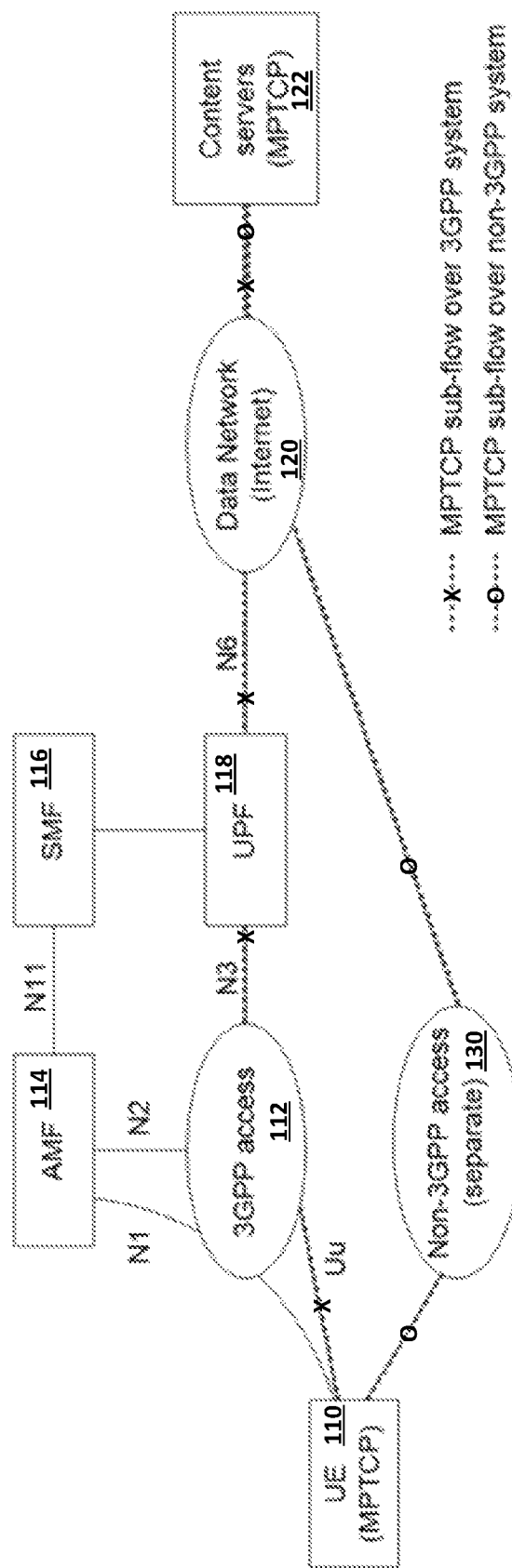
FIG. 1 depicts an example of a system configured to establish MPTCP sub-flows, in accordance with some example embodiments.

Like labels are used to refer to same or similar items in the drawings.

DETAILED DESCRIPTION

The subject matter disclosed herein relates to multi-connectivity technology, such as multipath transport control protocol (MPTCP). MPTCP extends the capabilities of TCP by providing connectivity between two endpoints over multiple paths. For example, MPTCP data segments may traverse end-to-end one or more separate, disjointed paths (which may be fully or partially disjoint). And, the MPTCP may allow the establishment of separate sub-flows over these paths. Each of the sub-flows may resemble a TCP connection with extended information in the header(s), such as an extended TCP option headers, to carry MPTCP signaling. Aspects of MPTCP may be in accordance with a specification, such as RFC 6182, March 2011, Architectural Guidelines for Multipath TCP Development, and RFC 6824, January 2013, TCP Extensions for Multipath Operation with Multiple Addresses.

In some example embodiments, there is provided a form of active mode traffic switching, which is a process that changes the path of a traffic flow during an ongoing data transfer, without disrupting the communication. The traffic switching may include changing the traffic flow during the initial traffic establishment (e.g., to ensure that the traffic is initially establishes on a given path). Alternatively or additionally, the traffic switching may include changing the path of the traffic flow being carried by an established connection (e.g., after connection establishment).

Within a single end-to-end connection, MPTCP may establish sub-flows across multiple and diverse paths. For a given end-to-end connection between applications at hosts for example, a first sub-flow may be carried by cellular technology, such as 3GPP's LTE, 4G, and/or 5G wireless networks, while a second sub-flow may be carried by a non-3GPP technology, such as wireless local area networking technology (e.g., WiFi), wired technologies, and/or the like. These sub-flows may transport chunks of data, such as data segments, each of which may have a TCP header and/or an MPTCP options header portion. Moreover, the sub-flows may be carried by systems managed or owned by different entities, such as a commercial cellular network owned or operated by a mobile network operator, a Wi-Fi hot spot or access point which may be owned or operated by, for example, a third party (e.g., a user's own home Wi-Fi and/or any other party including the mobile network operator).

FIG. 1 depicts an example of a user equipment 110 configured to establish MPTCP sub-flows over a wireless system, such as the 3GPP compliant system to enable user plane traffic to be carried between the user equipment (UE) 110 and server 122. The system may include a base station (e.g., an evolved Node B base station, 5G base station, and/or the like) 112, an access and mobility function (AMF) 114, a session management function (SMF) 116, a user plane function 118, a data network 120 (e.g., the Internet or other type of network), and a server 122 configured with MPTCP. FIG. 1 also depicts a non-3GPP access 130, such as over a WiFi access point to enable user plane traffic to be carried between the UE 110 and server 122.

In the case of FIG. 1, the 3GPP system may have issues when it comes to traffic steering or traffic switching MPTCP traffic between the 3GPP, cellular access and the non-3GPP (e.g., non-cellular such as WiFi access) access For example, the 3GPP system may lack of knowledge with respect to the non-3GPP traffic. To illustrate further, the 3GPP may not have visibility to the non-3GPP traffic, so the non-3GPP traffic not being served or handled (e.g., not passing through) by the 3GPP system may be considered "invisible" traffic. From the perspective of the application layer, the traffic steering or traffic switching action should be performed without disrupting the end-to-end connectivity between the UE 110 and the server 122 (e.g., without dropping a connection and directing the UE to another access technology as this may cause a connection reset or require the endpoints to trigger connection re-establishment). This lack of knowledge may also cause issues when reverting back to a former state (e.g., after a flow has been offloaded from cellular to non-cellular, and then reverting the flow back to cellular).

In some example, embodiments, there may be provided a system that serves at least one sub-flow of an end-to-end MPTCP connection, and the system may be able to access and modify packet header portions carried by the MPTCP segments. The segment refers to a TCP (or MPTCP) segment including a header portion and a data portion, such as a payload. In some example embodiments, at least one of the flows is an active sub-flow and at least one of the sub-flows is a backup. From the application layer's perspective there may be a single MPTCP or TCP connection, but that connection may include at least an established active sub-flow and at least an established backup sub-flow. Segments are carried only by an MPTCP active sub-flow, while the MPTCP backup sub-flow does not carry traffic until the backup sub-flow has a change in priority to active.

In some example embodiments, a network node may manipulate an MPTCP's sub-flow path priority mechanism to change a sub-flow from active to backup or backup to active. In some example embodiments, the network node may trigger an MPTCP sub-flow to fallback to a TCP connection to steer or switch traffic between different paths on a per connection, per sub-flow granularity.

In some example embodiments, most of the traffic steering or traffic switching capability may be preserved even when the system does not serve all sub-flows within an MPTCP connection. For example, the traffic steering or traffic switching may include steering or switching both the visible sub-flow traffic and the invisible sub-flow traffic. As noted, the priority of a sub-flow may be manipulated at different stages during the lifetime of an MPTCP connection, and an individual sub-flow may be manipulated to provide seamless traffic switching or traffic steering capability as further described below.

For traffic steering during MPTCP sub-flow establishment, the MPTCP may include an initial priority bit for each sub-flow. The initial priority may be included in the TCP header of a packet of the sub-flow (e.g., in an options portion, such as MPTCP options portions). The priority bit may be assigned (e.g., changed, manipulated, modified, and/or the like), so that a given sub-flow is created as an active sub-flow (which is ready for data transfer) or a backup sub-flow (which is in standby and not actively transfer data). The priority bit may be assigned to sub-flows which may be established by an intermediate network node where packets may be visible (e.g., accessible). An example of an intermediate node is described further below with respect to FIG. 2.

For traffic switching of established sub-flows, the sub-flow's initial priority (which may indicate whether the sub-flow is an active sub-flow or a backup sub-flow) may be changed during the sub-flow's lifetime. For example, changing a sub-flow's priority from active to backup may turn data transfer through the sub-flow off, while changing a sub-flow's priority from backup to active may turn data transfer through the sub-flow on. The change of priority may be performed on sub-flows the 3GPP system knows of but does not directly serve, such as the so-called "invisible" sub-flows. For example, a 3GPP network node may change the sub-flow priority for sub-flows carried via the 3GPP access (see, e.g., 112 at FIG. 1) where the 3GPP network node has knowledge regarding the sub-flow and change the sub-flow priority for "invisible" sub-flows carried non-3GPP flows (see, e.g., 130) where the 3GPP network cannot directly access or see packets transferred through the non-3GPP access 130.

For traffic steering by fallback, the MPTCP capability indication, such as the MP_CAPABLE option, of a sub-flow may be removed, which may trigger a fallback from MPTCP to TCP. This fallback may prevent the establishment of any further sub-flows for the established connection. As such, after fallback to TCP, the same connection cannot be turned into multipath capable MPTCP connection, although newly established connections may be established with the MPTCP multipath capability.

Figure 2:
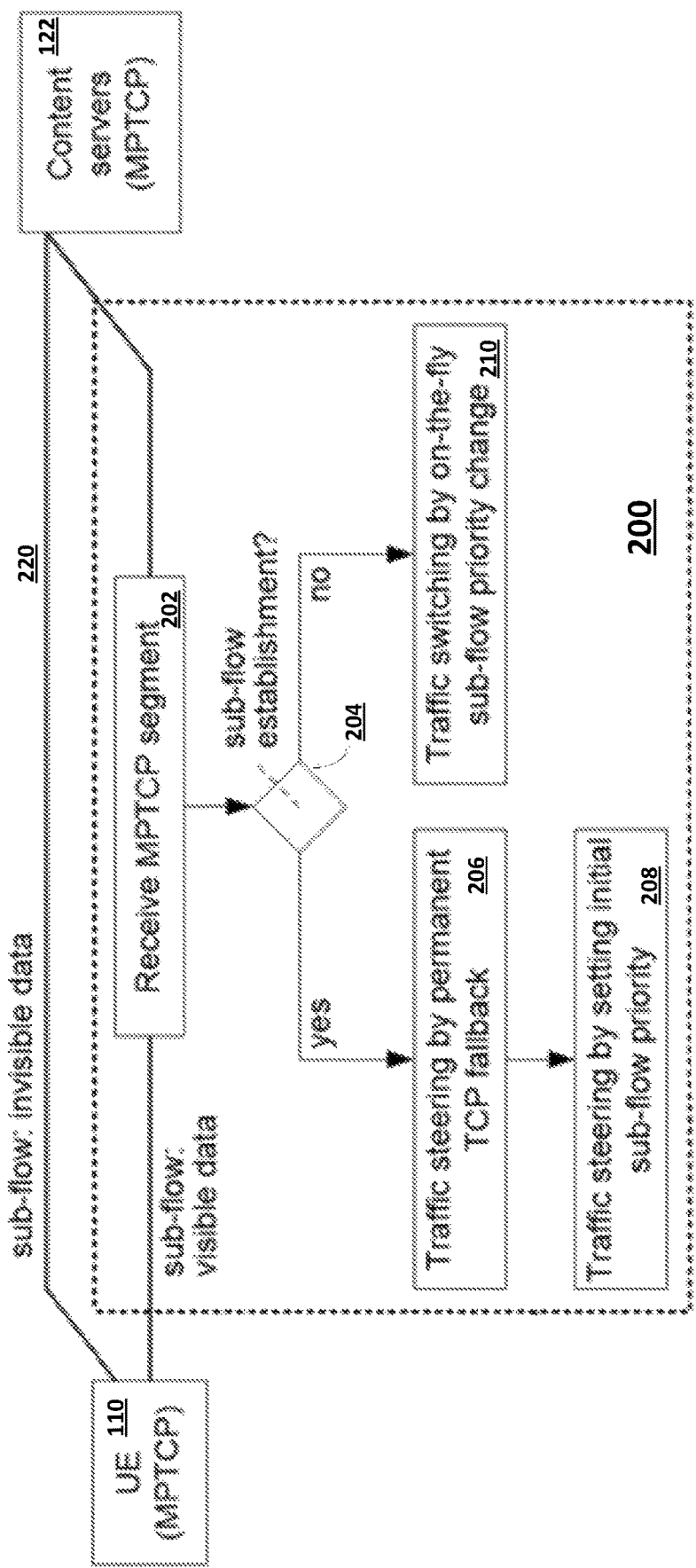
FIG. 2 depicts an example of an apparatus such as a network node, in accordance with some example embodiments.

FIG. 2 depicts an example of an apparatus such as a network node 200, in accordance with some example embodiments. The network node 200 may be implemented at a node having at least partial access to the packets of at least one MPTCP sub-flow. For example, network node 200 may be implemented at a base station (e.g., an evolved node B base station, 5G base station (gNB)) or at any other network node in the access network or packet core, such as the evolved packet core or 5G core, so long as the node has access to the packets of an MPTCP flow. To illustrate further, the network node 200 may be implemented at a evolved packet core packet gateway, a 5G core user plane function, and/or other nodes (which may be implemented as a physical network function or a virtualized network function) having access to user plane (U-plane) packets of the flows being handled by the node. In some implementations, the network node 200 may also be an intermediate or pass-through node having access to the packets of a MPTCP sub-flow, such that the network node can manipulate header portions of the segments, although the network node may also be implemented at a location where the MPTCP sub-flow is terminated as well.

In the example of FIG. 2, the network node 200 may receive, at 202, a segment including a data portion and a header portion. The received portion represents a visible sub-flow as the network node 200 has access to the packets. By contrast, the network node 200 may not have access to the "invisible" sub-flow 220 as this sub-flow may be handled or served by a non-cellular technology network, such as WiFi and the like. The network node 200 may then determine, at 204, whether the received segment represents a new flow being established or an existing, established flow.

If the received segment represents a new flow being established (yes at 204), the network node 200 may perform traffic steering, at 206, by triggering an MPTCP to TCP fallback (e.g., by turning off the MPTCP Capability option in a header as noted above). Alternatively or additionally, the network node 200 may perform traffic steering, at 208, by setting an initial priority, such as active or backup, of the sub-flow being established. If no at 204, the network node 200 is dealing with an already established MPTCP traffic flow, so the network node 200 may perform traffic switching, at 210, by changing the priority setting for the established MPTCP sub-flow (e.g., from active to backup or from backup to active).

As noted, the "invisible" data 220 represents a sub-flow not being served or handled by network node 200. For example, the invisible data in sub-flow 220 may represent segments carried by a non-3GPP access, so the network node 200 may have little (if any) information regarding the invisible sub-flow 220. In some example, embodiments, the network node 200, as explained further below with respect to FIGS. 4-8 may traffic steer and traffic switch sub-flow traffic even when the sub-flow is "invisible" to the network node.

Figure 3:
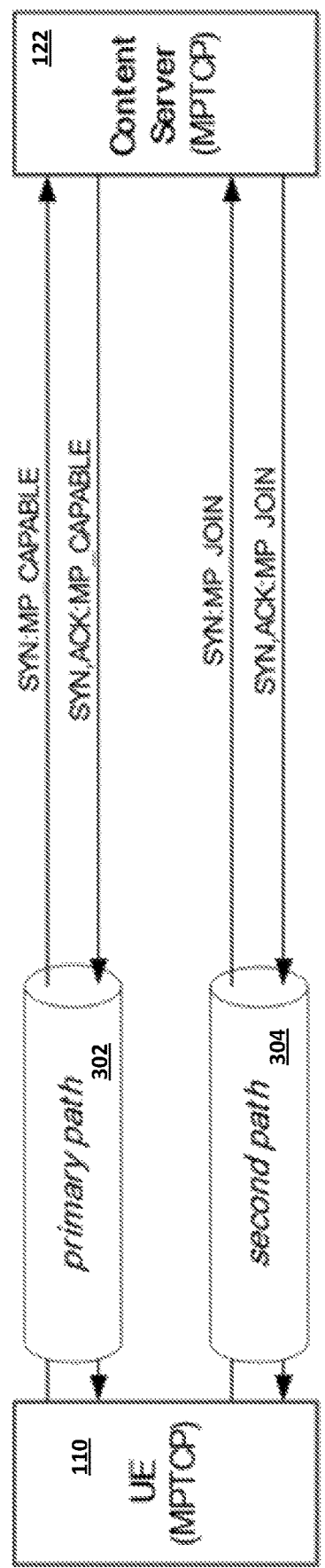
FIGS. 3-8 depict examples of MPTCP sub-flow handling, in accordance with some example embodiments.

FIG. 3 depicts an example of MPTCP connection establishment, in accordance with some example embodiments. In the example of FIG. 3, two MPTCP sub-flows are shown, a primary sub-flow 302 and a secondary sub-flow 304, although other quantities of sub-flows may be established as well. As used herein, a sub-flow refers to a flow within an end-to-end MPTCP connection. For example, the end-to-end MPTCP connection may be between two hosts or applications. In this example, there may be a plurality of sub-flows traversing over separate paths; some of the sub-flow paths may traverse a cellular network while other sub-flow paths may traverse a non-cellular network, such as a WiFi network.

The primary sub-flow 302 may have a MPTCP priority of "active" and may be the first sub-flow to be established, while the one or more secondary sub-flows 304 may have a MPTCP priority of "backup" or "active." The primary sub-flow establishment may be indicated by the MP_CAPABLE TCP option carried in a TCP SYN segment (which is part of the TCP three-way handshake). Additional sub-flows may be established with an MP_JOIN TCP option in a SYN segment. The secondary sub-flow(s) may be linked to the primary sub-flow using related tokens in the MP_CAPABLE and MP_JOIN segments, which enables the network node 200 to recognize which MPTCP sub-flows belong to the same MPTCP connection. As noted, the MPTCP options may be encoded in the TCP options with an Option Kind of 30. The Multipath TCP options have a Kind of 30, a variable length, and the remainder of the content beginning with a 4-bit subtype field as shown in Table 1.

TABLE 1

| Value | Symbol | Name |
| --- | --- | --- |
| 0x0 | MP_CAPABLE | Multipath Capable |
| 0x1 | MP_JOIN | Join Connection |
| 0x2 | DSS | Data Sequence Signal (Data ACK and data sequence mapping) |
| 0x3 | ADD_ADDR | Add Address |
| 0x4 | REMOVE_ADDR | Remove Address |
| 0x5 | MP_PRIO | Change Sub-flow Priority |
| 0x6 | MP_FAIL | Fallback |
| 0x7 | MP_FASTCLOSE | Fast Close |
| 0xf | (PRIVATE) | Private Use within controlled testbeds |

In some example embodiments, the network node 200 may steer or switch the traffic between the primary path 302 and at least one second path 304. The steering/switching may be achieved by turning data transmission on or off on selected paths, which restricts communication to a given path. The switching may be performed a plurality of times during the lifetime of an MPTCP connection. And, this switching among the sub-flows may be performed without disrupting the end-to-end connectivity provided by the MPTCP connection (e.g., with performing a connection tear-down and re-establishment of the MPTCP connection. The network node 200 may change the priority of the second path 304 to make it "active," which triggers active traffic to be carried via path 304. Likewise, the network node 200 may change the priority of the first path 302 to make it "backup," so it no longer carries traffic. At any given instant, and MPTCP connection may have one or more sub-flows (established through different paths) and some (if not all) of those sub-flows may be active or some (if not all) may be in backup (or inactive).

The implementation of the traffic steering or traffic switching may depend on which sub-flows are accessible to the network node 200 and/or which is a preferred path for carrying user data traffic. As for path accessibility and desired flow path, there are, for example, at least four combinations: (1) steer traffic to the primary path wherein the network node 200 does have access to the packets of the primary sub-flow (and may or may not have access to the secondary sub-flow); (2) switch traffic to the primary path wherein the network node 200 may not have access to the packets of the primary sub-flow (but does have access to the secondary sub-flow); (3) switch traffic to the secondary path wherein the network node 200 does have access to the packets of the secondary sub-flow (and may or may not have access to the primary sub-flow); and (4) switch traffic to the second path wherein the network node 200 may not have access to the packets of the secondary sub-flow (but does have access to the primary sub-flow). With respect to (1) and (2), the network node 200 may have a policy to keep the traffic on the primary sub-flow (e.g., switch the secondary sub-flow to backup mode or prevent its establishment in the first place). In the case of (3) and (4), the network node 200 may have a policy to keep the traffic on the secondary sub-flow by switching the primary sub-flow to backup. These switching/steering mechanisms may be generalized onto higher number of secondary sub-flows.

The desired traffic steering action in the above four cases may be implemented as follows.

Figure 4:
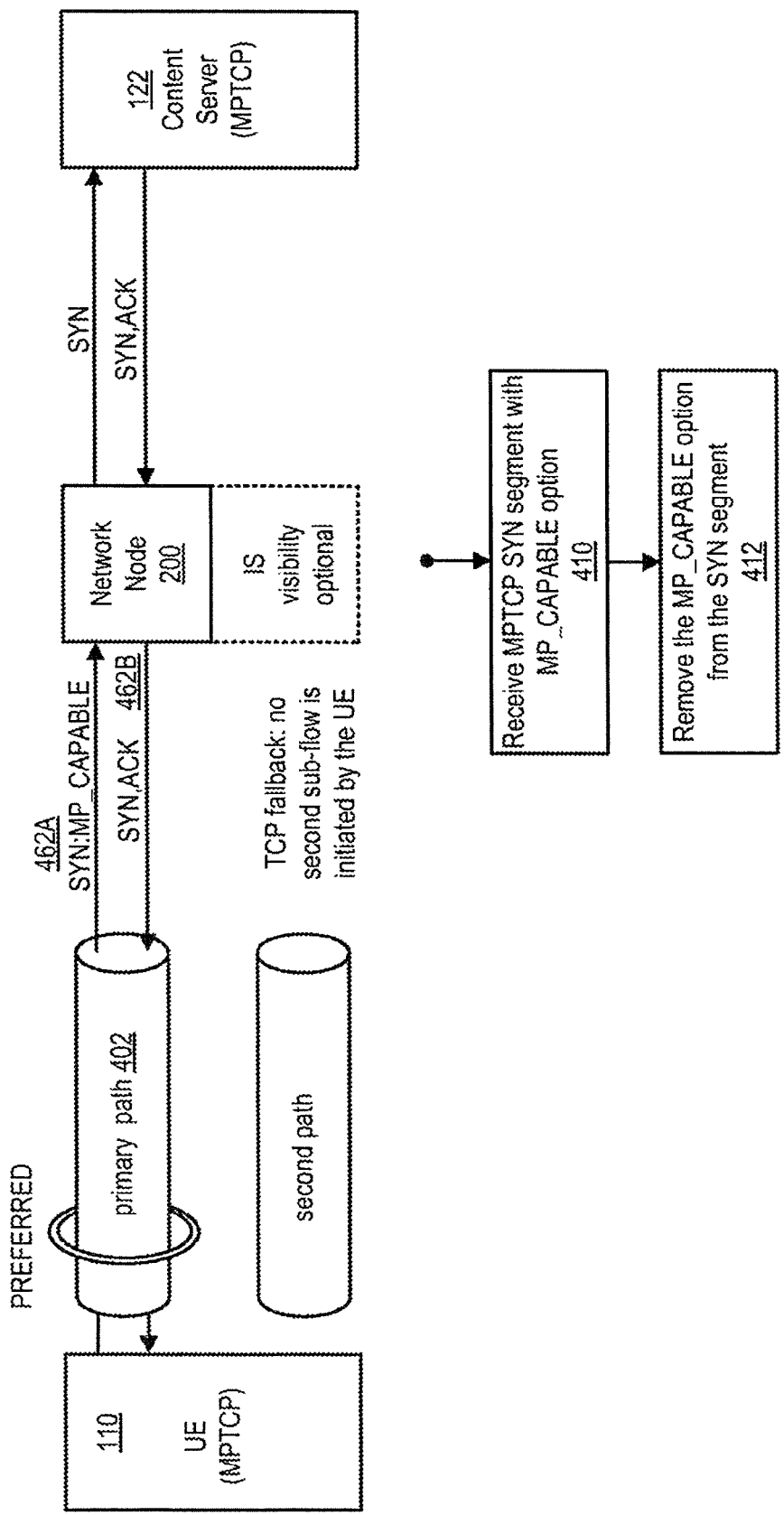

Regarding case (1) in which there is provided steering to the primary path with access to primary sub-flow packets, FIG. 4 illustrates this example. In the example of FIG. 4, the network node 200 receives, at 410, a MPTCP SYN segment with the MP_CAPABLE MPTCP Option and removes (e.g., strips), at 412, the MP_CAPABLE MPTCP option from the initial SYN segment (which is part of the three-way TCP handshake at setup). This removal of the MP_CAPABLE option may trigger the MPTCP of the primary path 402 to fallback to TCP fallback, so a traditional TCP connection is established via the primary path 402, which is the only path for this connection.

As shown at FIG. 4, the network node 200 receives a SYN segment at 462A including the MP_CAPABLE, and then the network node responds at 462A without the MP_CAPABLE. As noted, there is no capability to establish an MPTCP path unless a new connection is established, such as created. The example of FIG. 4 may be desirable in instances where the preferred path for a new connection is known upfront and is a permanent one; otherwise, it is may be more desirable to allow the MPTCP connection to fully establish any sub-flows and switch the traffic to the primary path as in described further below with respect to FIGS. 5 and 6.

Figure 5:
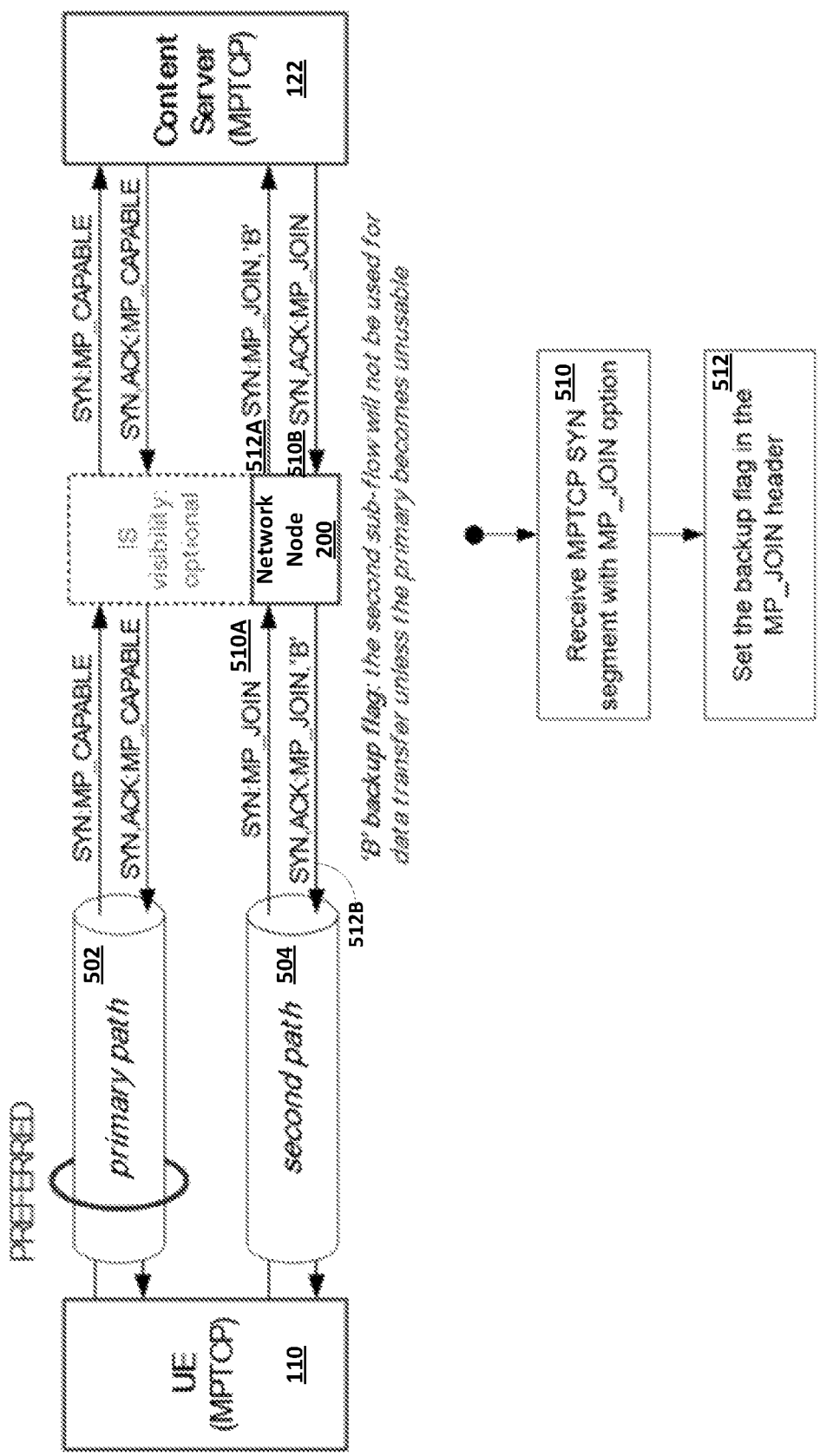

FIG. 5 depicts an example implementation of switching to the primary path 502 during initial MPTCP connection establishment handshaking without the network node having access to primary sub-flow packets (2 above, also referred to as case 2A). In the example of FIG. 5, the network node 200 has access to the sub-flow packets of sub-flow 504, but does not have access to the packets of sub-flow of the primary path 502 (so the packets of path 502 are not visible or invisible to the network node 200).

At 510, the network node 200 may receive a MPTCP SYN segment with the MP_JOIN MPTCP option. The MP_JOIN can be used to associate a new sub-flow to an already established MPTCP connection. At 512, the network node may set a backup indication or flag (e.g., flag "B") in the MP_JOIN header to indicate that the second path should be treated as a backup path. For example, a temporary traffic switching action leaving only the primary sub-flow active 502 is achieved by inserting the backup flag "B" into the header of the MP_JOIN TCP option 512 in the TCP SYN of the secondary sub-flow handshake. The backup flag is inserted both in the uplink SYN and downlink SYN segments (as shown at 512A-B) to ensure that the secondary sub-flow 504 is switched to backup mode into both directions. Alternatively or additionally, the backup mode for the secondary sub-flow 504 may be set in only one direction (e.g., leaving the secondary sub-flow active in UL and as a backup in DL, or vice versa). In some implementations, the example of FIG. 5 may be implemented when, for example, the decision to deactivate the secondary sub-flow is available before the establishment of the MPTCP connection; otherwise, the mechanism described below with respect to FIG. 6 may be applied. After the secondary sub-flow 504 is made a backup, the secondary sub-flow 504 may be switched from backup to active (e.g., reactivation of backup sub-flows as described further below).

Figure 6:
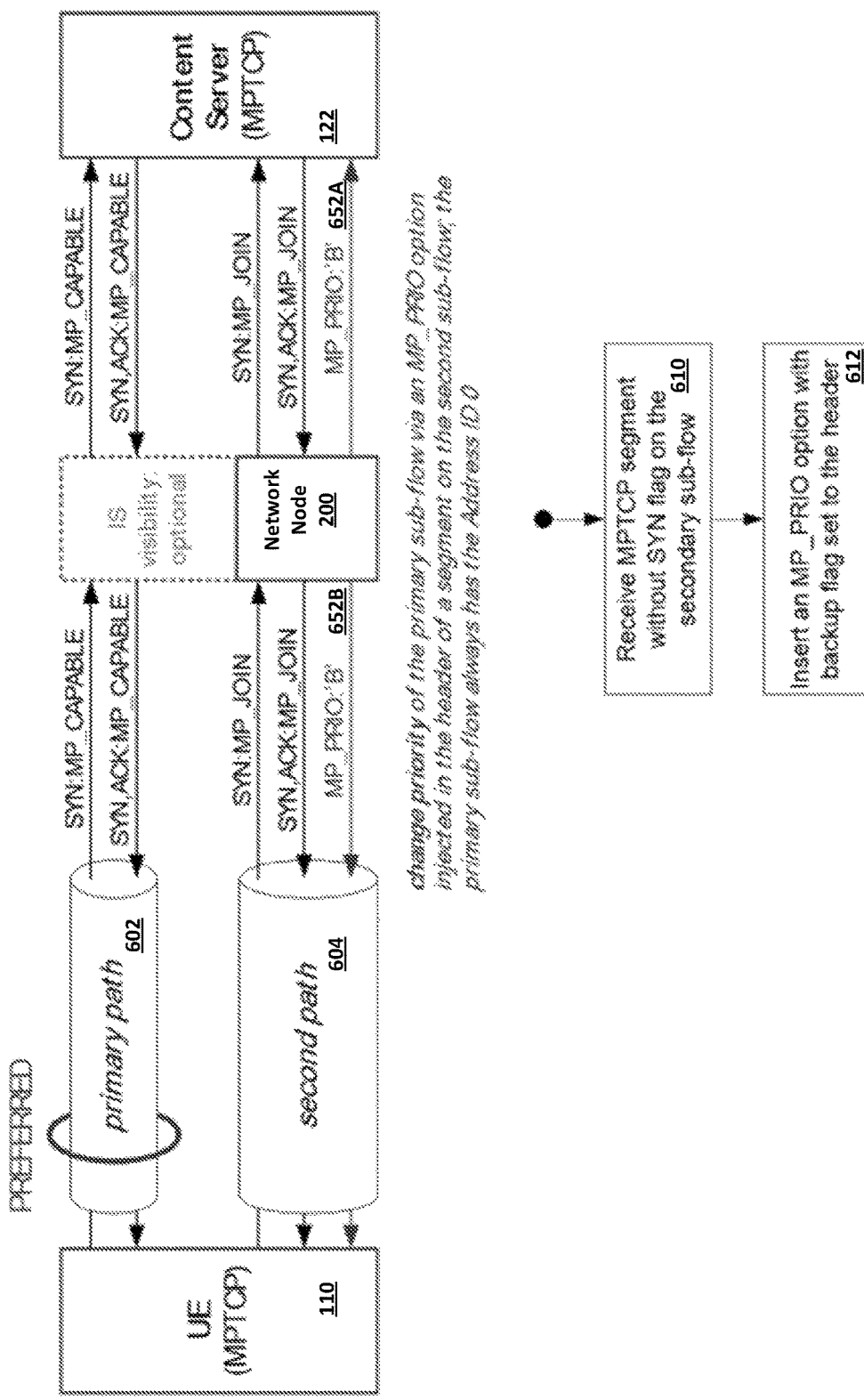

FIG. 6 depicts an example implementation of switching to primary path after the initial MPTCP connection establishment handshaking, without the network node 200 having access to primary sub-flow packets (2 above, also referred to as case 2B). This mechanism may be executed any time during the lifetime of the MPTCP connection and after the establishment of both primary sub-flow 602 and secondary sub-flow(s) 604 have been completed. In the example of FIG. 6, the network node inserts an MP_PRIO MPTCP option with a backup flag (e.g., flag "B") in one of the segments transmitted in the secondary sub-flow 604, which switches the secondary sub-flow 604 to backup mode (as the MP_PRIO without additional parameters affects the sub-flow on which it was sent), so the second path does not carry traffic as it is a backup and the first path 602 remains as the active sub-flow path carrying traffic.

At 610, the network node 200 may receive, at 610, an MPTCP segment and, at 612, the network node may insert an MP_PRIO MPTCP option with a backup flag (e.g., flag "B") set in the header. The MP_PRIO MPTCP option (which is used to signal a change in the sub-flow priority) may be sent on the uplink direction 652A, the downlink direction 652B, or both. Also, after this action, the secondary sub-flow may be switched from backup to active later on using a mechanism discussed later (reactivation of backup sub-flows).

Figure 7:
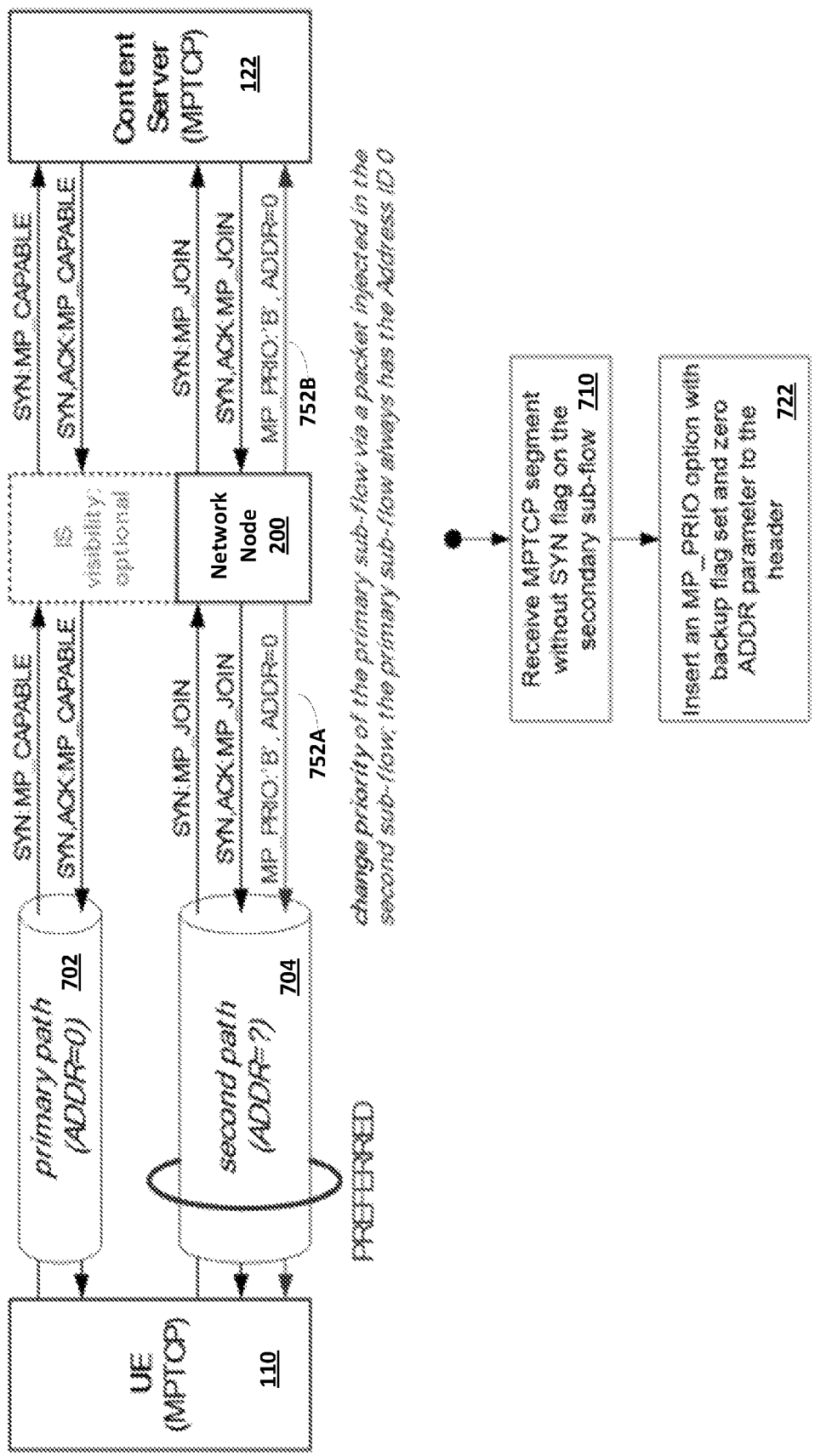

FIG. 7 depicts an example implementation of switching to a second path, with the network node having access to second sub-flow packets (3 above, also referred to as case 3). The process at FIG. 7 is somewhat similar to FIG. 6 but in FIG. 7 the MP_PRIO with the backup flag sent on the secondary sub-flow has an additional address (ADDR) parameter set to zero as shown at 752A-B. This zero address indicates that the MP_PRIO, although sent on the secondary sub-flow, affects the priority of the primary sub-flow (the primary sub-flow has a zero address ID as per the MPTCP protocol specification). As a result of the action, the traffic will be switched to the secondary sub-flow 704 and the primary sub-flow 702 (which was prior to 752A/B carrying active traffic) will be kept as backup.

At 710, the network node 200 receives an MPTCP segment without the SYN flag on the secondary sub-flow, and the network node may insert, at 722, an MP_PRIO option with a backup flag (e.g., flag "B") and the address ID can be set to "zero" to signal that the change in priority is for the primary sub-flow 702, so the primary sub-flow 702 changes to a backup while he secondary path changes to an active sub-flow carrying traffic. In other words, the network node 200 changes a priority of a sub-flow 702 that is invisible to the network node. This change of priority may be used to switch traffic to the invisible sub-flow 702 (e.g., by making invisible sub-flow 702 "active") or to switch traffic away from the invisible sub-flow 702 (e.g., by making invisible sub-flow 702 "backup" so sub-flow 702 does not carry user plane traffic).

Even if the network node 200 has no direct access to the primary sub-flow 702, observing the MP_JOIN option indicates that the visible path is only a secondary path 704 so there should be a primary path (although perhaps not visible to the network node 200) whose address ID is always a known value, such as zero in accordance with RFC-6824, for example. The MP_PRIO option including the address ID zero (which is used to signal a change in the sub-flow priority of the primary path 702) may be sent on the uplink direction 752B, the downlink direction 752A, or both. The example of FIG. 7 may be used, for example, to grab traffic from a non-cellular access (e.g., Wi-Fi) to the 3GPP system (e.g., LTE/5G) even if the non-cellular access is fully separate from the 3GPP system.

Figure 8:
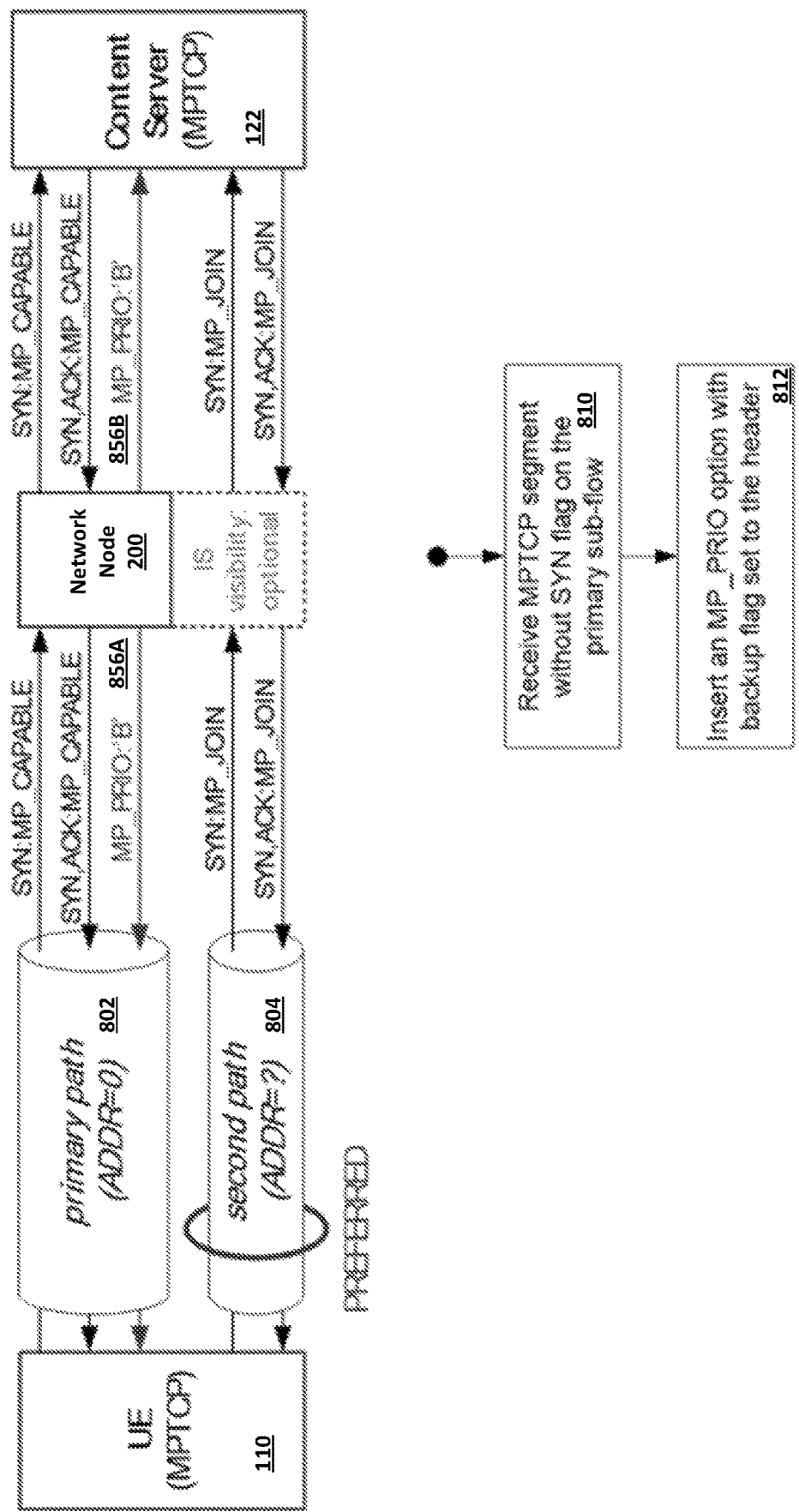

FIG. 8 depicts an example implementation of switching to a second path 804, when the network node 200 has access to primary sub-flow packets (4 above, also referred to as case 4). At 810, the network node 200 may receive an MPTCP segment without the SYN flog on the primary flow 802, and then the network node 200 may insert, at 812, an MP_PRIO option with a backup flag "B" set to the header. As there is no additional parameters is transmitted along with the MP_PRIO at 856A-856B, the MP_PRIO option backup flag B is applied to the primary sub-flow itself 802. The MP_PRIO option backup flag B may be sent on the uplink direction 856B, the downlink direction 856A, or both. The MP_PRIO option backup flag B changes the priority of the primary path from one state to another (e.g., from active to backup so path 802 will not carry active traffic but path 804 is now active carrying traffic).

The reactivation of a sub-flow that has been switched to backup may be performed in a variety of ways. In the case the primary sub-flow was put to backup, the secondary sub-flow is still active and the mechanism with respect to FIG. 7 (see, case 3) may be applied (e.g., MP_PRIO, ADDR=0) but the MP_PRIO does not need to have the backup flag set. This indicates, via the secondary sub-flow, a switch of the primary sub-flow (ADDR=0) to active mode. After, the mechanisms of case 3 (FIG. 7) or case 4 (FIG. 8) may be used to switch the secondary sub-flow to backup.

In case the secondary sub-flow was put to backup, the primary sub-flow may still be active and the mechanism in FIG. 8 (e.g., case 4) may be applied (e.g., MP_PRIO, ADDR=?) with the difference that the MP_PRIO does not have the backup flag set and the additional ADDR parameter needs to the set to the ID of the secondary sub-flow. The ID of the secondary sub-flow may be collected from either the secondary sub-flow itself, from the MP_JOIN option (if the secondary sub-flow is visible to the system), or from the primary sub-flow listening to ADD_ADDR options that announce the existence of additional paths. If there is a need to reactivate sub-flows put to backup, the ID of each secondary sub-flows may be saved by the network node so that the network node can refer to the IDs later.

Traffic steering or traffic switching may be trigger by a variety of conditions. For example, application policies, poor radio link quality, and/or the like. For example, certain types of applications (e.g., over the top video streaming, web, social network, chat, etc.) may be served over 3GPP or non-3GPP access per a policy. The enforcement of such policy may require that a selected path (e.g., a primary path) on MPTCP sub-flow level be made available at the network node. This implementation may include an application detection function at the user plane function (UPF) and/or a packet marking function to indicate the selected path to the network node.

In the case of link quality, poor radio link quality may steer/switch traffic away from, or towards, the 3GPP access. For example, the network node may be located at a base station, such as the gNB. As the 5G's centralized radio control unit (CU-CP) collects radio link information and the 5G's centralized radio control unit (CU-UP) executes the steering/switching as per the above implementation options. The E1 interface may require that the CU-UP notifies the CU-CP on MPTCP capable flow and requests that the radio link quality is monitored by the CU-CP (based on RRC measurements) and a reverse notification is sent (from CU-CP to CU-UP) when the quality degrades below a certain threshold (similarly to LTE A2 measurement triggers). Additionally, new PCF/gNB interaction may be needed to communicate such radio link quality based steering policy from the PCF to the gNB CU.

In the context of collecting insight such as application or end-to-end connection level measurements, individual systems may face certain technical challenges. For example, there may be a challenge in detecting that the data transfer being served by a network node is only part of the full end-to-end connection (e.g., there are other sub-flows (which may not be visible to the network node or its system) that have been established through other systems. There may be a challenge in measuring the amount of traffic transferred end-to-end within a connection, including those packets that are invisible (transferred through other systems). There may be a challenge in dealing with real time total throughput measurement of a connection or measuring throughput for sub-flows not visible to the network node (or its system) as those sub-flows may be handled by other technologies or systems. Without certain information, some network node including systems may lack the knowledge of the extent of an end-to-end connection. This lack of knowledge may prevent decisions to be made on certain types of actions related to traffic, such as QoS or QoE management actions. For example, the system may not be able to decide whether it would be worthwhile to initiate traffic steering/switching actions to push/pull traffic to/from other systems to improve the QoS/QoE of the corresponding application. Additionally, measuring/inferring application type based on traffic pattern or estimating QoS/QoE levels based on the observed throughput may be challenging or misleading if the observed traffic itself does not comprise the full (or actual) end-to-end communication.

In some example embodiments, there may be provided a way to monitor and/or analyze sub-flows associated with an MPTCP connection. In some example embodiments, information including the presence of additional "invisible" sub-flows not served by (and thus not directly visible to) a given network node (or its corresponding system) may be obtained and further including certain performance parameters of those additional sub-flows.

In some example embodiments, the dual byte sequence numbering property of MPTCP may be used in order to detect the existence of sub-flows that are not visible to the system or network node. In the header of each MPTCP segment, the traditional TCP sequence number becomes a sub-flow level sequence number that accounts for the bytes transferred over the sub-flow carrying the segment. Moreover, a Data Sequence Signal (DSS) carries the Data Sequence Mapping, which includes a sub-flow sequence number, a data sequence number, and a length for which this mapping is valid (see, e.g., RFC-6824, January 2013). The DSS is inserted, as a TCP Option, into each segment to indicate the mapping sub-flow's sub-flow sequence number to the overall data sequence numbering of the end-to-end connection. This mapping effectively indicates where the sub-flow segment/packet fits into the overall end-to-end MPTCP connection, and as such may provide an indication of the aggregate, total flow across all the sub-flows for that MPTCP connection. By comparing the progress of the sub-flow sequence number with the mapping exposed via DSS, the observing system/network node is able to account for the amount of data transferred through the visible sub-flow as well as through the entire connection (including the visible sub-flow and all additional "invisible" sub-flows not directly visible to the system). By maintaining the sub-flow and end-to-end connection level measurements over time, the throughputs in the visible sub-flow and in the entire connection are both available.

Figure 9:
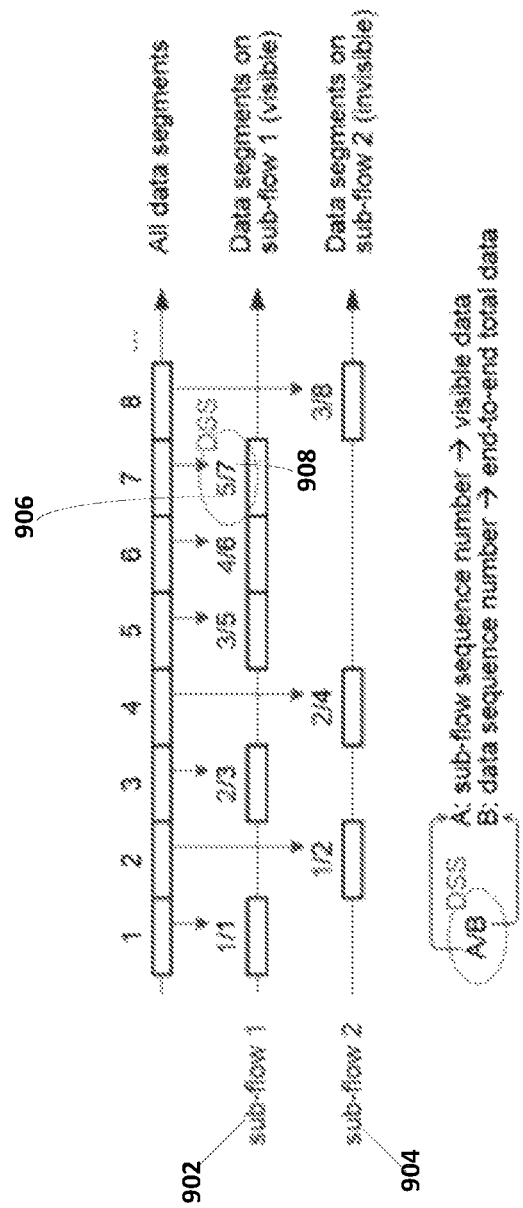
FIG. 9 depicts the dual-sequence numbering in MPTCP, in accordance with some example embodiments.

FIG. 9 depicts the dual-sequence numbering in MPTCP. In the example, there are two sub-flows, one of which is visible 902 and the other is not visible 904. For example, the visible sub-flow 902 may be visible to the network node 200 as it is handling or serving the user data traffic, while the invisible sub-flow 904 may not be visible to the network node 200 as network node 200 may not be handling or serving the sub-flow (e.g., the invisible sub-flow may be carried by another accesses technology such as WiFi as noted above).

The data sequence signal (DSS) may provide an indication of how each of the sub-flow sequence numbers maps into the sequence of the data segments. For example, sub-flow 1's 902 5 segment (labeled 906) represents the $5^{th}$ segment visible to the network node 200. This $5^{th}$ segment 906 maps into the 7 (labeled 908) of the overall data sequence. In this way, the network node 200 knows there is another sub-flow 904 which the network node 200 may not be serving or handling.

Figure 10:
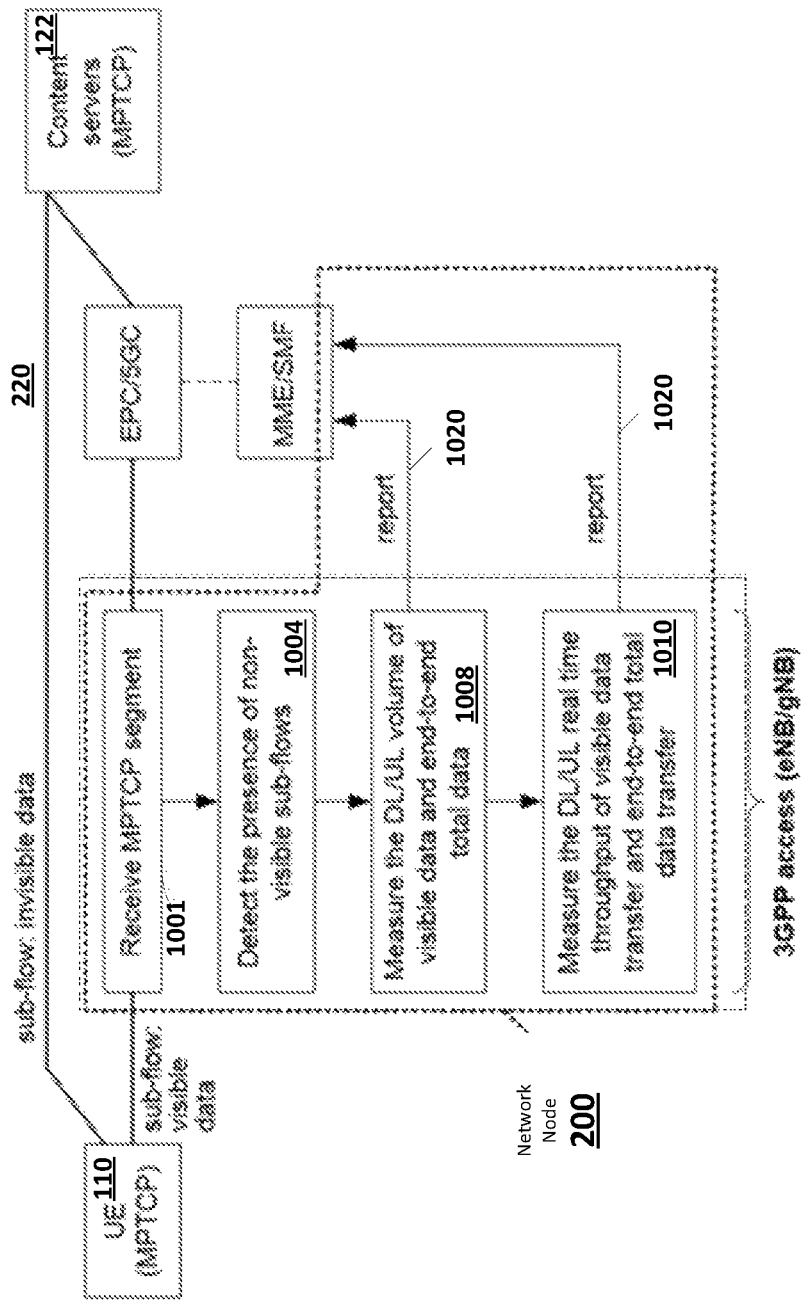
FIG. 10 depicts another example of a network node, in accordance with some example embodiments.

FIG. 10 depicts an example of a network node 200, in accordance with some example embodiments. In some example embodiments, the network node 200 may be implemented in a node having access to sub-flow traffic. As noted, the network node may be implemented in a base station (e.g., an evolved node B base station, 5G base station (gNB)) or at any other network node in the access network or packet core, such as the evolved packet core of 5G core (e.g., UPF) where there is access to the packets of an MPTCP flow. In some example embodiments, the network node 200 implements the process 1001-1020. Alternatively or additionally, the network node 200 may perform additional operations as described above with respect to FIGS. 2-8, for example. The network node may be configured to have read-only access to the MPTCP segments (user-plane packets), although write access may be allowed as well.

Figure 11:
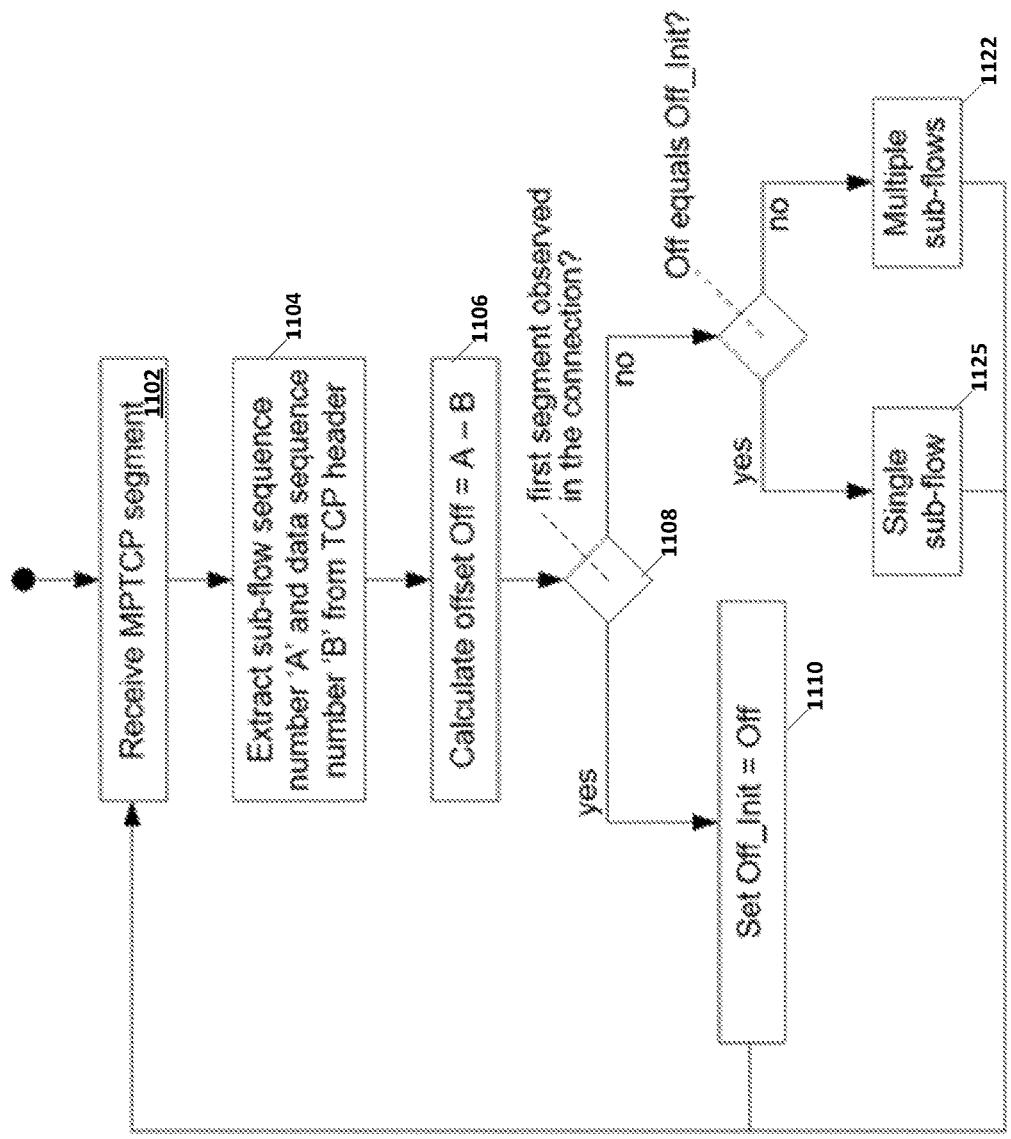
FIG. 11 depicts an example of a process for detecting the presence of the "invisible" MPTCP sub-flows, in accordance with some example embodiments.

At 1001, the network node 200 may receive an MPTCP segment and, at 1005, detect the presence of sub-flows that are not visible (e.g., invisible sub-flows) to the network node. In some example embodiments, the presence of the MPTCP sub-flows which are not visible is based on the monitoring of the DSS option field carried by the segments in the uplink and/or downlink (e.g., segments with non-zero payload). FIG. 11 depicts an example of a process for detecting the presence of the "invisible" MPTCP sub-flows, in accordance with some example embodiments.

At 1102, the network node, such as network node 200, may receive at least one MPTCP segment. At 1104, the network node 200 may extract, from the DSS option, the sub-flow sequence number and the data sequence number. At 1106, the network node 200 may compute the offset between the data sequence number and the sub-flow sequence number. If it is the first segment observed of an MPTCP connection (yes at 1108), the network node 200 may save, at 1110, the offset as an initial offset for the connection and skip the rest of the process. If not (no at 1108), the network node 200 may compare, at 1120, the current offset with the initial offset saved at 1110. If the two offsets differ, then the current sub-flow is not the only established sub-flow with active data communication (no at 1120 and 1122). If the two offsets are the same, then the current sub-flow is the only established sub-flow with active data communication (yes at 1120 and 1125).

Figure 12A:
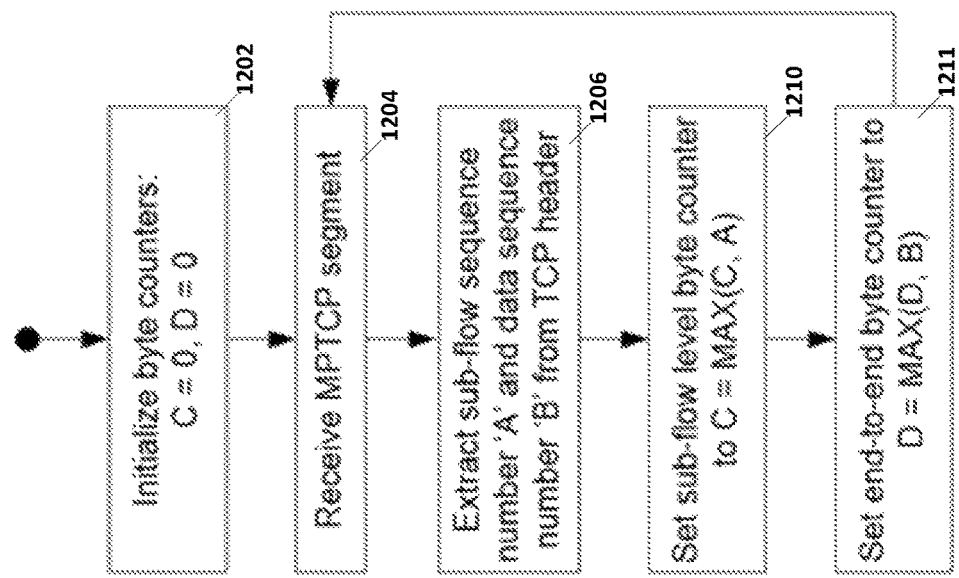
FIG. 12A depicts an example process for determining data volume across visible and invisible sub-flows, in accordance with some example embodiments.

Referring again to FIG. 10, the network node 200 may, at 1008, measure the downlink and/or uplink volume of data in visible sub-flows and measure the overall, end-to-end total data (which includes visible and invisible parts). The measurement of the DL/UL data volume on visible and non-visible MPTCP sub-flows is performed as follows as shown at FIG. 12A. The process at FIG. 12A may monitor the DSS option field carried by a downlink segment or uplink segment (e.g., segments with non-zero payload).

At 1202, the network node 200 may initialize two-byte counters. For example, a first byte counter, C, may be established for the sub-flow level and another counter, D, may be established for the end-to-end level. The counters may be incremented, when the corresponding sequence number increases (e.g., as new data has been transferred over the sub-flow and/or end-to-end).

At 1204, the network node, such as network node 200, may receive at least one MPTCP segment. At 1206, the network node 200 may extract, the sub-flow sequence number (e.g., "A") and the data sequence number (e.g., "B") from the TCP header and/or the DSS option portion of the header. At 1208, the network node 200 may set the sub-flow level byte counter, C, to a maximum value corresponding to whichever is larger C or A. At 1210, the network node 200, may set the end-to-end byte counter to D to whichever is larger C or B. The sub-flow level byte counter, C, provides the data volume on the visible sub-flow, while the end-to-end counter, D, provides the total volume (which includes visible and invisible). The cumulative volume of all invisible sub-flows is the difference between the sub-flow level counter and the end-to-end counter. If all sub-flows are visible, the difference is still zero, indicating that the network nodes handle the full communication in the end-to-end MPTCP connection.

Referring again to FIG. 10, the network node 200 may, at 1010, measure the downlink and/or uplink real-time throughput of data in visible sub-flows and the end-to-end total data transfer. The measurement of the DL/UL real-time throughput is implemented as an extension to the data volume measurement of 1008. To that end, the network node may periodically save a snapshot of the sub-flow and end-to-end level data volume counters and calculate the increment in data since the previous snapshot. The increment divided by the time period of the snapshot defines the throughput on the sub-flow and end-to-end level. Again, the cumulative throughput of the invisible sub-flows is the difference of the sub-flow level and end-to-end level throughputs.

For example, each time an MPTCP segment is received at 1001, the network node 200 may perform sub-flow detection 1004, DL/UL data volume measurement 1008, and DL/UL real time throughput measurement 1010, where these measurements are maintained for both the visible part of the end-to-end traffic and, if detected, the invisible part. The network node may report, at 1020 and/or 1030, the measurements to other network nodes, such an MME, SMF, a 5G core node (5GC), and/or the like. In some example embodiments, the reporting at 1020 and 1030 may be via the Report of Secondary RAT data volumes Function as per 3GPP TS 36.300.

The measurements reported at 1020 may be used for a variety of purposes. In the case of accurate application detection and QoS/QoE measurement for example, the awareness of the full traffic that the application transfers enables to estimate the level of service the application experiences. Such estimation may further trigger QoS management actions (e.g., increasing the resources provided to the application's flows transferred by the 5G system to increase the end-to-end performance) or traffic switching actions (e.g., offloading the part of the traffic served by the 5G system to the other paths to decrease the load on the 5G system, knowing that the application would still perform properly with the amount of resources/throughput given by the other paths). Another type of actions based on the improved insight based on the reporting at 1020 is to prepare the 5G system for an immediate takeover of the full traffic of the application. Knowing the amount of traffic transferred in end-to-end and assuming that the other connectivity may be interrupted abruptly (e.g., due to mobility that is not handled by the other access but handled by 5G), the 5G system may prepare to proactively allocate resources for full end-to-end traffic within the 5G system to provide a seamless experience for the application during and after such transients. Such treatments may be applied to applications/flows selectively depending on their requirements.

FIG. 12B depicts an example of a process 1200, in accordance with some example embodiments.

At 1250, the network node 200 may receive at least one packet of a sub-flow of a multipath transport control protocol connection associated with user plane traffic, in accordance with some example embodiments. The received at least one packet may include at least header having a multipath transport control protocol option. As noted, the use plane traffic may be carried by a plurality of MPTCP sub-flows. For example, a MPTCP connection may include a plurality of sub-flows At 1252, the network node 200 may switch the sub-flow by at least changing the multipath transport control protocol option. This switching may switch the sub-flow on (e.g., make it active state) to allow the user plane traffic to flow through the sub-flow. The switching may switch the sub-flow off (e.g., backup state) to prevent the user plane traffic from passing through the sub-flow such that the switched user plane traffic is carried by at least another sub-flow. The switching may change the multipath transport control protocol option by removing the MP_CAPABLE option from the header. When the MP_CAPABLE option is removed, the removal triggers a fallback from the multipath transport control protocol connection to a transport control protocol connection for the user plane traffic. The switching may change a sub-flow state by an indication in the multipath transport control protocol option in the sub-flow (e.g., by an indication in a header of the sub-flow being received by the network node). The sub-flow state may include a backup state or an active state, so the changing of the sub-flow state enables the user plane traffic to be carried by the sub-flow in the active state. The switching may include changing a sub-flow state by an indication of the multipath transport control protocol option in another sub-flow (e.g., by an indication in a header of another sub-flow (e.g., an invisible sub-flow). The multipath transport control protocol option may include an MP_Prio, an MP_Join, and/or MP_Prio including an address of the sub-flow or the other sub-flow.

In some implementations, the network node may detect, based on a data sequence number and a sub-flow sequence number obtained from the header, a presence of an invisible sub-flow not passing through the network node. The network node may switch the invisible sub-flow (e.g., another sub-flow(s) not passing through the network node) on or off by at least changing the multipath transport control protocol option in the header of the packet of the sub-flow received by the network node. The switching of the invisible sub-flow on allows the user plane traffic to pass through the invisible sub-flow, and the switching the invisible sub-flow off prevents the user plane traffic from passing through the invisible sub-flow and allows the user plane traffic to be carried by at least one other sub-flow. The switching of the user plane traffic may be between a cellular radio access network and a non-cellular network. The user plane traffic may represent traffic being offloaded from the cellular radio access network to the non-cellular network comprising a WiFi network.

Figure 13:
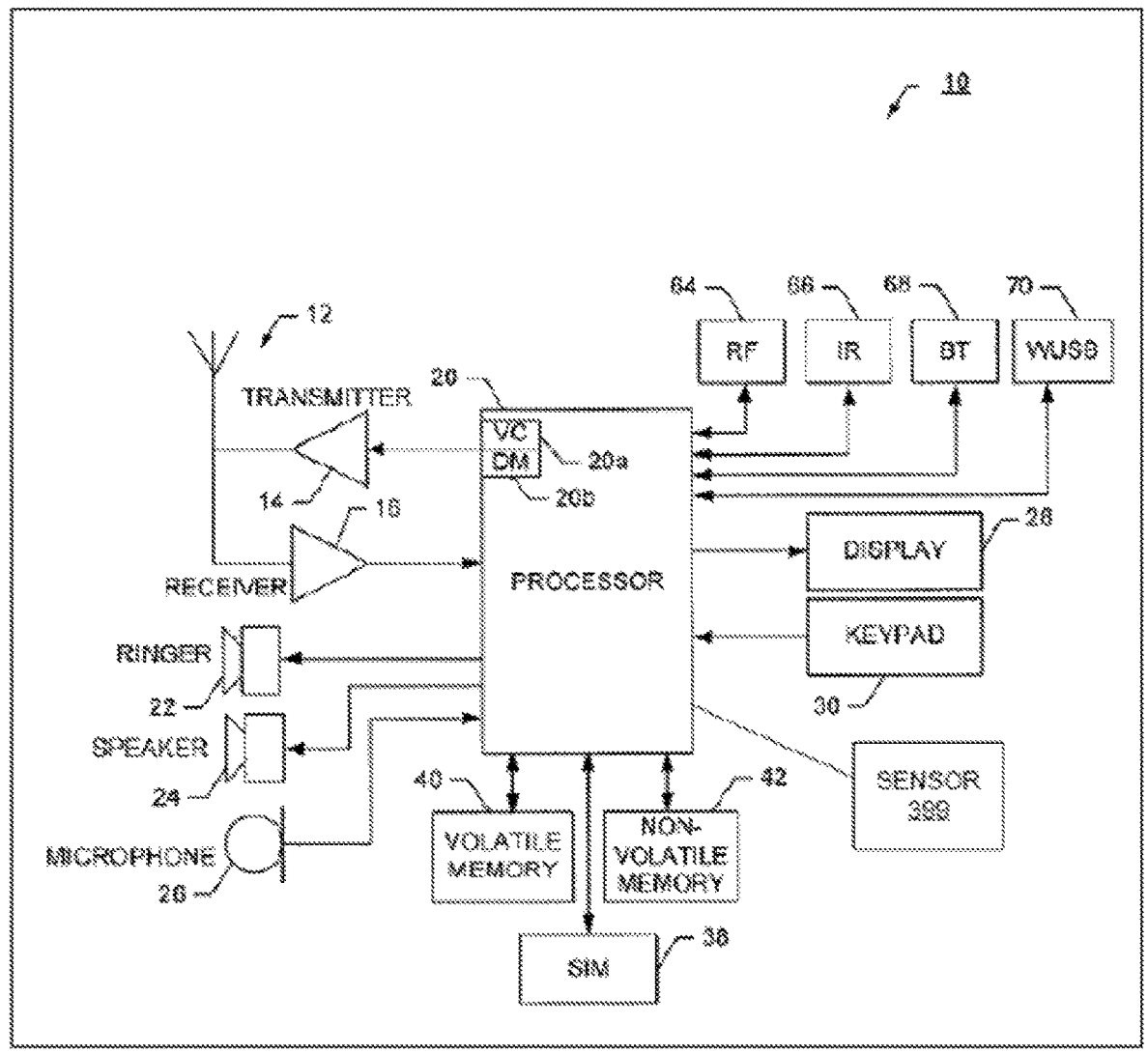
FIG. 13 depicts an example of an apparatus, in accordance with some example embodiments.

FIG. 13 illustrates a block diagram of an apparatus 10, in accordance with some example embodiments The apparatus 10 may represent a user equipment, such as a wireless device, although certain aspects of the apparatus 10 may be used to implement a network node, such as a base station or other type of network node. The apparatus 10 may configured to provide one or more operations disclosed herein for handling MPTCP sub-flows for traffic steering or traffic switching between 3GPP cellular systems and non-3GPP systems, such as WiFi, fixed land line networks, and/or the like.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 13 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 13, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein including, for example, receiving, by a network node, at least one segment of a sub-flow of a multipath transport control protocol connection; detecting, based on a data sequence number and a sub-flow sequence number obtained from the sub-flow, a presence of at least one invisible sub-flow not passing through the network node; and switching, when the at least one invisible sub-flow is detected, the at least one invisible sub-flow carrying user plane traffic.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein, such as receiving, by a network node, at least one packet of a sub-flow of a multipath transport control protocol connection associated with user plane traffic, the at least one packet including a header, the header further including a multipath transport control protocol option; and switching, by the network node, the sub-flow by at least changing the multipath transport control protocol option. For example, the processor 20 may be configured using computer code stored at memory 40 and/or 42 to provide one or more aspects described above including aspects of the processes discloses herein (see, e.g., FIG. 12B).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 13, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced handling of sub-flows and enhanced traffic switching or steering.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. A method comprising:

receiving, by a network node, at least one packet of a sub-flow of a multipath transport control protocol connection associated with user plane traffic, the at least one packet including a header, the header further including a multipath transport control protocol option; and switching, by the network node, the sub-flow by at least changing the multipath transport control protocol option, wherein the switching switches the sub-flow on to allow the user plane traffic to flow through the sub-flow on a first path and switches the sub-flow off to prevent the user plane traffic on the first path and cause the user plane traffic to be carried by a second sub-flow on a second path, wherein either the first sub-flow or the second sub-flow is an invisible sub-flow that does not pass through or accessible by the network node performing the switching, the method further comprising:

detecting, based on a data sequence number and a sub-flow sequence number obtained from the header, a presence of an invisible sub-flow not passing through the network node;

switching, by the network node, the invisible sub-flow on or off by at least changing the multipath transport control protocol option in the header of the packet of the sub-flow received by the network node, wherein the switching of the invisible sub-flow on allows the user plane traffic to pass through the invisible sub-flow, and the switching the invisible sub-flow off prevents the user plane traffic from passing through the invisible sub-flow and allows the user plane traffic to be carried by at least one other sub-flow,
wherein the switching of the user plane traffic is between a cellular radio access network and a non-cellular network and the user plane traffic represents traffic being offloaded from the cellular radio access network to the non-cellular network comprising a WiFi network,
wherein the network node comprises a cellular network node, wherein the invisible sub-flow is carried over a non-cellular network.

2. The method of claim 1, wherein the switching comprises changing the multipath transport control protocol option by removing a MP_CAPABLE option from the header.

3. The method of claim 2, wherein the removing the MP_CAPABLE option triggers a fallback from the multipath transport control protocol connection to a transport control protocol connection.

4. The method of claim 1, wherein the switching comprises changing a sub-flow state by an indication in the multipath transport control protocol option in the sub-flow, wherein the sub-flow state comprises a backup state or an active state, wherein the changing of the sub-flow state enables the user plane traffic to be carried by the sub-flow in the active state or prevents the user plane traffic to be carried by the sub-flow in the backup state.

5. The method of claim 1, wherein the switching comprises changing a sub-flow state by an indication of the multipath transport control protocol option in the second sub-flow, wherein the sub-flow state comprises a backup state or an active state, wherein the changing of the sub-flow state enables the user plane traffic to be carried by the sub-flow in the active state.

6. The method of claim 1, wherein the multipath transport control protocol option comprises an MP_Prio, an MP_Join, and/or MP_Prio including an address of the sub-flow or the other sub-flow.

7. The method of claim 1 further comprising:
measuring downlink and uplink volume of data in visible sub-flows and measuring overall, end-to-end total data comprising visible and invisible parts, wherein the measurement of the downlink and the uplink data volume on visible and non-visible multipath transport control protocol sub-flows includes monitoring a data sequence signal option field carried by a downlink segment or an uplink segment;
measuring downlink and uplink real-time throughput of data in visible sub-flows and an end-to-end total data transfer, wherein the measurement of the downlink and uplink real-time throughput is implemented as an extension to the data volume measurement, wherein the network node periodically saves a snapshot of sub-flow and end-to-end level data volume counters and calculates an increment in data since a previous snapshot, and the increment is divided by a time period of the snapshot that defines the throughput on the sub-flow and end-to-end level.

8. The method of claim 1, further comprising:
using a dual byte sequence numbering property of multipath transport control protocol to detect an existence of sub-flows that are not visible to the system or network node, wherein in the header of each multipath transport control protocol segment, a traditional transport control protocol sequence number becomes a sub-flow level sequence number that accounts for a number of bytes transferred over the sub-flow carrying the segment and a Data Sequence Signal (DSS) carries Data Sequence Mapping, including a sub-flow sequence number, a data sequence number, and a length for which this mapping is valid, and the DSS is inserted into each segment to a sub-flow sequence number to an overall data sequence numbering of the end-to-end connection.

9. An apparatus, comprising:
at least one processor; and
at least one memory including computer program code, the at least one memory and the computer program code configured to, with the at least one processor, cause the apparatus to at least:
receive at least one packet of a sub-flow of a multipath transport control protocol connection associated with user plane traffic, the at least one packet including a header, the header further including a multipath transport control protocol option; and
switch the sub-flow by at least changing the multipath transport control protocol option, wherein the sub-flow is switched on to allow the user plane traffic to flow through the sub-flow on a first path and switched off to prevent the user plane traffic on the first path and cause the user plane traffic to be carried by a second subflow on a second path, wherein either the first sub-flow or the second sub-flow is an invisible sub-flow that does not pass through or accessible by the apparatus performing the switching;
wherein the at least one memory and the computer program code are further configured to, with the at least one processor, cause the apparatus to at least:
detect, based on a data sequence number and a sub-flow sequence number obtained from the header, a presence of an invisible sub-flow not passing through the network node;
switch the invisible sub-flow on or off by at least changing the multipath transport control protocol option in the header of the packet of the sub-flow received by the network node,
wherein the switching of the invisible sub-flow on allows the user plane traffic to pass through the invisible sub-flow, and the switching the invisible sub-flow off prevents the user plane traffic from passing through the invisible sub-flow and allows the user plane traffic to be carried by at least one other sub-flow,
wherein the switching of the user plane traffic is between a cellular radio access network and a non-cellular network and the user plane traffic represents traffic being offloaded from the cellular radio access network to the non-cellular network comprising a WiFi network.

10. The apparatus of claim 9, wherein the switch comprises a change to the multipath transport control protocol option by removing a MP_CAPABLE option from the header.

11. The apparatus of claim 10, wherein the removing the MP_CAPABLE option triggers a fallback from the multipath transport control protocol connection to a transport control protocol connection.

12. The apparatus of claim 9, wherein the switch comprises a change to a sub-flow state by an indication in the multipath transport control protocol option in the sub-flow, wherein the sub-flow state comprises a backup state or an active state, wherein the change of the sub-flow state enables the user plane traffic to be carried by the sub-flow in the active state, wherein the multipath transport control protocol option comprises an MP_Prio, an MP_Join, and/or MP_Prio including an address of the sub-flow or the other sub-flow.

13. The apparatus of claim 9, wherein the switch comprises a change to a sub-flow state by an indication of the multipath transport control protocol option in the second sub-flow, wherein the sub-flow state comprises a backup state or an active state, wherein the changing of the sub-flow state enables the user plane traffic to be carried by the sub-flow in the active state or prevents the user plane traffic to be carried by the sub-flow in the backup state.

14. The apparatus of claim 9, wherein the at least one memory and the computer program code are further configured to, with the at least one processor, cause the apparatus to at least:

measure downlink and uplink volume of data in visible sub-flows and measure overall, end-to-end total data comprising visible and invisible parts, wherein the measurement of the downlink and the uplink data volume on visible and non-visible multipath transport control protocol sub-flows includes monitoring a data sequence signal option field carried by a downlink segment or an uplink segment;

measure downlink and uplink real-time throughput of data in visible sub-flows and an end-to-end total data transfer, wherein the measurement of the downlink and uplink real-time throughput is implemented as an extension to the data volume measurement, wherein the network node periodically saves a snapshot of sub-flow and end-to-end level data volume counters and calculates an increment in data since a previous snapshot, and the increment is divided by a time period of the snapshot that defines the throughput on the sub-flow and end-to-end level.

15. The apparatus of claim 9, wherein the at least one memory and the computer program code are further configured to, with the at least one processor, cause the apparatus to at least:

use a dual byte sequence numbering property of multipath transport control protocol to detect an existence of sub-flows that are not visible to the system or network node, wherein in the header of each multipath transport control protocol segment, a traditional transport control protocol sequence number becomes a sub-flow level sequence number that accounts for a number of bytes transferred over the sub-flow carrying the segment and a Data Sequence Signal (DSS) carries Data Sequence Mapping, including a sub-flow sequence number, a data sequence number, and a length for which this mapping is valid, and the DSS is inserted into each segment to a sub-flow sequence number to an overall data sequence numbering of the end-to-end connection.

16. A non-transitory computer readable storage medium including program code which when executed causes operations comprising:

receiving at least one packet of a sub-flow of a multipath transport control protocol connection associated with user plane traffic, the at least one packet including a header, the header further including a multipath transport control protocol option; and switching the sub-flow by at least changing the multipath transport control protocol option, wherein the switching switches the sub-flow on to allow the user plane traffic to flow through the sub-flow on a first path and switches the sub-flow off to prevent the user plane traffic on the first path and cause the user plane traffic to be carried by a second sub-flow on a second path, wherein either the first sub-flow or the second sub-flow is an invisible sub-flow that does not pass through or accessible by a network node performing the switching;

detecting, based on a data sequence number and a sub-flow sequence number obtained from the header, a presence of an invisible sub-flow not passing through the network node;

switching the invisible sub-flow on or off by at least changing the multipath transport control protocol option in the header of the packet of the sub-flow received by the network node, wherein the switching of the invisible sub-flow on allows the user plane traffic to pass through the invisible sub-flow, and the switching the invisible sub-flow off prevents the user plane traffic from passing through the invisible sub-flow and allows the user plane traffic to be carried by at least one other sub-flow, wherein the switching of the user plane traffic is between a cellular radio access network and a non-cellular network and the user plane traffic represents traffic being offloaded from the cellular radio access network to the non-cellular network comprising a WiFi network.

17. The non-transitory computer readable storage medium of claim 16 wherein the program code when executed causes operations comprising:

measuring downlink and uplink volume of data in visible sub-flows and measuring overall, end-to-end total data comprising visible and invisible parts, wherein the measurement of the downlink and the uplink data volume on visible and non-visible multipath transport control protocol sub-flows includes monitoring a data sequence signal option field carried by a downlink segment or an uplink segment;

measuring downlink and uplink real-time throughput of data in visible sub-flows and an end-to-end total data transfer, wherein the measurement of the downlink and uplink real-time throughput is implemented as an extension to the data volume measurement, wherein the network node periodically saves a snapshot of sub-flow and end-to-end level data volume counters and calculates an increment in data since a previous snapshot, and the increment is divided by a time period of the snapshot that defines the throughput on the sub-flow and end-to-end level.

18. The non-transitory computer readable storage medium of claim 16 wherein the program code when executed causes operations comprising:

using a dual byte sequence numbering property of multipath transport control protocol to detect an existence of sub-flows that are not visible to the system or network node, wherein in the header of each multipath transport control protocol segment, a traditional transport control protocol sequence number becomes a sub-flow level sequence number that accounts for a number of bytes transferred over the sub-flow carrying the segment and a Data Sequence Signal (DSS) carries Data Sequence Mapping, including a sub-flow sequence number, a data sequence number, and a length for which this mapping is valid, and the DSS is inserted into each segment to a sub-flow sequence number to an overall data sequence numbering of the end-to-end connection.

* * * * *